Oct. 21, 1969
J. JOSEPHSON
3,473,376
PURE-FLUID TIDE GAUGE
Filed Nov. 30, 1966
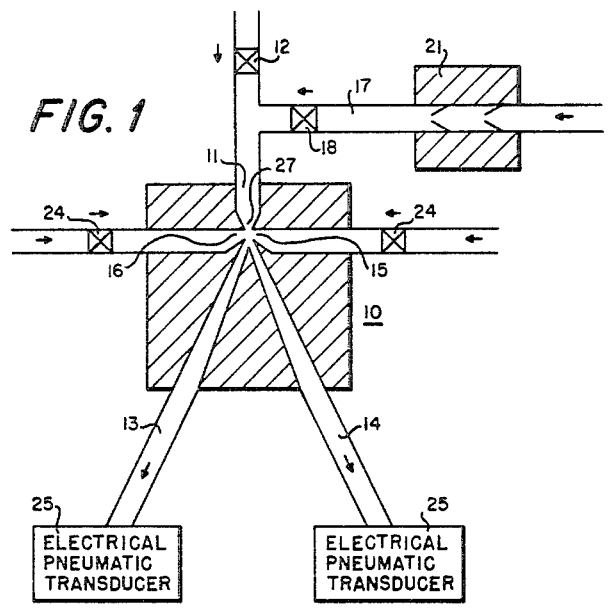
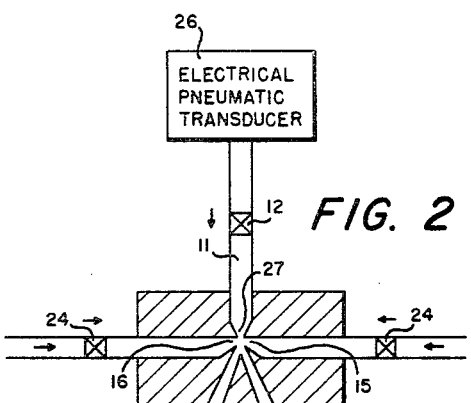
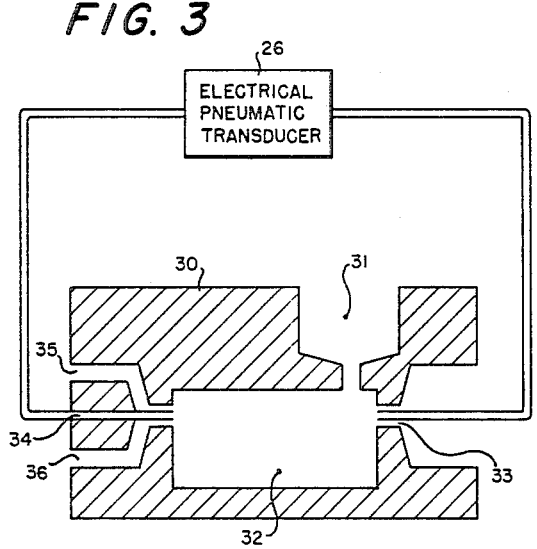
INVENTOR
JULIAN JOSEPHSON
BY Melvin L. Crane AGENT
ATTORNEY

United States Patent Office 3,473,376
Patented Oct. 21, 1969

3,473,376
PURE-FLUID TIDE GAUGE
Julian Josephson, 4814 Eastern Lane,
Suitland, Md. 20023
Filed Nov. 30, 1966, Ser. No. 598,121
Int. Cl. G01w 1/00
U.S. Cl. 73—170                                1 Claim

ABSTRACT OF THE DISCLOSURE

This invention is directed to a system which makes use of fluid amplifiers to measure tide fluctuations, and wave height, as well as internal waves, The incoming tide operates as a control to direct the output of a fluid amplifier through a special output to a recorder and the ebb tide operates to direct outputs through another separate output to be recorded. Each of the outputs may be telemetered to shore stations as well as ships so that knowledge of the tides may be known.

---

The invention described herein may be manufactured and used by or for the Government of the United States of America for governmental purposes without the payment of any royalties thereon or therefor.

Field of the invention

The present invention is directed to a tide measuring device and more particularly to a tide measuring device making use of fluid amplifiers.

Description of the prior art

It is well known in the art that tide information may be obtained by use of shore stations as well as buoys. One such shore station device employs a float in a 4-inch diameter well wherein the float is suspended from piano wire which in turn causes a metal stylus to move up and down a sheet of wax paper wrapped around a drum. The drum rotates by means of clockworks which are mechanically wound. The wax paper is graduated in time of day as well as in height of tide. Such a device must be tended at least once every two days. The piano wire is subject to kinking, thereby impairing the operation thereof. Clockwork breakdown is frequent and such a device must be attached to a shore facility. Another device measures the tide fluctuation by means of measuring pressure change. These pressure changes are made by purging nitrogen gas at constant pressure and carefully measuring opposing pressure of water against the constnat nitrogen pressure. Such a system is not always reliable and also must be attached to a shore facility. Still another system for measuring tide has been carried out by anchoring a buoy system to the bottom of the water in about 100 feet of water. A pressure transducer is attached to the line from the buoy to its anchor wherein the transducer is connected to a data logging system in a subsurface buoy by means of cabling. The logging system contains a timer, data sequencing modules, a magnetic tape recorder, telemetering equipment and a power supply. The entire system is difficult to launch and weighs approximately 5000 lbs. This system is designed to be left unattended for about 30 days.

Summary

The drawbacks of the prior art systems are varied, they are expensive, complicated in operation, they are not accurate at times, and require considerable attention. It is well known in the art that pressure increases as water depth increases. Therefore, as a tide moves in, the depth of the water increases thereby increasing the pressure on an object held at a specific position relative to the bottom in the area in which the element is placed. Also, as the ebb tide moves out the pressure will decrease thereby a measure by the element will indicate that the tide is moving out.

The present invention is directed to a system which is secured to an anchored line at a certain position relative to the ground or bottom such that the device will be under water at all times. That is, during the time that the tide comes in and the time that the tide goes out.

It is therefore an object of the present invention to provide an expensive, efficient, reliable device for ascertaining tide information.

Still another object is to provide a device which makes use of the oceanic environment in order to determine tide information.

Yet another object is to provide a tide measuring device which may be used on a shore facility as well as away from a shore facility.

Other objects and advantages of this invention will hereinafter become more fully apparent from the following description of the annexed drawing, in which:

FIG. 1 is a cross-sectional view of a flip-flop fluid amplifier and associated elements used for ascertaining tide information;

FIGS. 2 and 3 are modifications of the device shown by illustration in FIG. 1.

The main element of the tide measuring device of the present invention is a non-memory flip-flop fluid amplifier. Tide flow pressure input directs the fluid output through one output of the fluid amplifier whereas the ebb tide flow passes through a fluid diode and is controlled such that the output is through a separate output. Thus, a measure of the pressure from the separate outputs indicates whether the tide is coming in or going out.

Now referring to the drawings, there is shown by illustration in FIG. 1, a tide determining device made in accordance to the present invention. As shown, the system includes a non-memory flip-flop fluid amplifier 10 having an input 11 with a one-way control valve 12 therein. The flip-flop amplifier includes outlets 13 and 14 and control passages 15 and 16. A second pressure input line 17 is connected to input line 11 below the one-way valve 12 therein and includes therein a one-way valve 18 and a diode 21 connected at the end of the input line 17. As shown, each of the control passages have connected thereto inlet lines within which one-way control valves 24 are positioned. Each of the outlets are connected to a transducer recording device 25 or a device which produces an electrical signal according to the pressure output from each respective output.

Operation of the system as shown in FIG. 1 is as follows:

The device is positioned at a definite position below the surface of the water in alignment with the flow direction and held there by an anchor and a buoy arrangement. The amplifier as shown in FIG. 1 is positioned such that the inlet to valve 24 and control passage 16 is away from the shore to detect an incoming tide whereas diode 21 is in a direction toward the shore. As the tide comes in, water above the inlet 11 due to the pressure because of the increased height of the water due to the tide enters the amplifier through valve 12 and the input 11 and water due to the incoming flow or parallel motion of the water enters through valve 24 and control passage 16. The water passing through the control passage forces the water entering through the inlet 11 such that the water passes through outlet 14. The pressure of the water passing through the outlet operates the pneumatic-electrical transducer such that the pressure data is recorded or an electrical signal which may be telemetered to a shore station or a ship depending on the type of device operative by the pressure from the output, or simply retained within the device by any suitable recording system. As the tide comes in, and the water gets deeper, there will be greater pressure on the water flowing through the inlet; therefore the pressure at the outlet will increase and have a greater reaction on the transducer-recorder device whereby a measure of the tide will be determined by the amount of pressure from the outlet of the flip-flop amplifier. Once the tide has come in and is at its maximum, the pressure will stabilize and will give an indication that there is a full tide. As the tide ebbs, the water flow is away from shore and since the diode 21 is positioned toward shore the out flowing water passes through the fluid diode 21 into the inlet tube of the flip-flop fluid amplifier below the one-way valve 12. The diode 21 amplifies the water entering the diode due to the ebb tide to increase the water pressure passing through pressure input 11 into the fluid amplifier. The horizontal component also flows through control inlet 15 such that the water passing through the input to the flip-flop amplifier is forced by the control inlet 15, out through the output 13 of the flip-flop amplifier. The pressure from the output 13 influences the operation of the transduced-recorder or transducer-electrical device such that the information is recorded or telemetered to a shore station or ship depending on the apparatus used. As the tide ebbs to its lowest point, the output pressure in the output 13 will cease thereby indicating that the tide is at its lowest point. The operation of the device repeats itself over and over for the incoming tide and outgoing tide as described above. If desired, the one-way control valves in each of the inputs or control passages may be electrically operated by a timer device wherein the power supplied to the flip-flop fluid amplifier will be regulated such that a power jet enters the device every 240 seconds or any other time arrangement desired. The timer may be operated for incoming tide and outgoing tide, if desired. This would facilitate filtering out extraneous wave data.

The system shown in FIG. 1 may be duplicated for any number of amplifier stages wherein the additional stages may or may not, as desired, include the same type of input control and diode with the outputs of the first and each succeeding stage connected to the control ports of each succeeding stage. The outputs of the final stage will be connected with a suitable water pressure-record converter device such that the water pressure is either recorded or telemetered to a shore facility or ship as pointed out above for FIG. 1.

FIG. 2 is a modification of the device shown in FIG. 1 wherein the diode ebb tide inlet tube is removed and an electrical-pneumatic transducer element 26 is secured to the inlet of the flip-flop fluid amplifier. The electrical-pneumatic input transducer may be of any desired type such as an electrically operated pump or preferably an electrical heating element which will heat and direct water into the input to produce a water flow by convection. The electrical-pneumatic transducer imparts motive power to the water entering through the inlet thereof thus producing a constant pressure supply at the power jet 27 of the flip-flop amplifier 10. In the device as illustrated by FIG. 2, the pressure read at lowest tide would be a reference pressure, or tide datum. When the tide is higher than datum level, the tide level will shown up as a difference between the magnitude of the pressure pulse in the control inlet of the flip-flop fluid amplifier and the reference pressure delivered by the electrical pneumatic transducer at the power jet inlet of the flip-flop amplifier. This device will determine both the height of the tide and the direction of the tide i.e. "in" or "out."

In operation of the system as shown by FIG. 2, the device as shown is positioned such that the inlet to the control 16 is in the direction of the incoming tide and the inlet to the control 15 is in the direction of the ebb tide. The electrical-pneumatic transducer delivers a constant pressure at the input or power jet 27 to the flip-flop fluid amplifier and as the tide comes in the water flow enters through control inlet 16 to force the water pressure through outlet 14. The pneumatic transducer secured to outlet 14 will indicate that the tide is coming in. As the height of the tide increases, the pressure due to the height of the water increases the pressure at control inlet 16 thereby increasing the pressure at the outlet 14. This increase in pressure will increase the indication by the transducer. Thus, the measure indicated by the transducer 25 secured to outlet 14 will indicate both direction and height of the tide. As the tide is going out, the water will enter through control 15 and will force the water passing through the power jet 27 out through outlet 13. As described for FIG. 1, each of the outlets are provided with a transducer-recorder device or transducer-electrical signal producing device which signal may be directed to a telemetering system such that the signal will be telemetered to a short facility or ship or recorded within the device by any suitable recording system. Also, as described for the device shown by FIG. 1, there may be a plurality of amplifier stages wherein the input of one or more amplifier stages is provided with an electrical-pneumatic transducer. Each of the outputs are connected to the control inputs of the transducer. Outputs of the last amplifier stage will be connected to a suitable transducer recorder or transducer electrical signal telemetering system.

The modification as illustrated by FIG. 3 involves the use of a transverse impact fluid modulator (a self-contained device). The transverse impact modulator includes an input signal 31 due to tide fluctuations which connects a pressure chamber 32. A supply jet 33 on one side of the chamber opens into the chamber. A second supply inlet 34 opens into the chamber from the opposite side of the first supply line. The pressure chamber, in turn, is connected to a ring-shaped output passage which surrounds the inlet 34; 35 and 36 represent opposite sides of this passage. This output passage is not directly connected to any supply passages. An electrical-pneumatic transducer 26 such as explained above, for FIG. 2, is used to provide a constant supply of equal intensity at the first and second supply pressure inlets.

In operation of the modification as shown by FIG. 3, the electrical-pneumatic transducer supplies a constant supply of pressure at each of the inlets as shown. The tide fluctuations produces an input signal through the input passage 31 into the tank resulting in an output signal at the output passage in which 35 and 36 represent opposite sides of the output passage. Therefore the pressure flow from the output is through the circular outlet represented by 35 and 36. The output signal recorded is the difference between the supply pressure at the pressure inlet 34 and the input pressure through the input passage 31. The device as shown in FIG. 3 would be used primarily in areas in which the tide fluctuations are very slow and shallow. The output signal woulld be connected with a transducer which would record a signal or transmit a signal depending on the type of instrumentation used with the transducer.

Obviously many modifications and variations of the present invention are possible in the light of the above teachings. It is therefore to be understood that within the scope of the appended claim the invention may be practiced otherwise than as specifically described.

What is claimed and desired to be secured by Letters Patent of the United States is:

1. A system adapted to be placed in a body of water in a fixed position for determining tide fluctuations; which comprises:

a flip-flop fluid amplifier, said flip-flop fluid amplifier including an input jet, first and second oppositely disposed control passages one on each side of said input jet normal thereto and first and second output passages controlled by said control passages, a fluid flow control means, said fluid flow control means connected with said input jet for admitting fluid under pressure into said input jet, said first fluid control passage permitting fluid flow therethrough due to an incoming tide thereby forcing a fluid flow out of said second output passage, said second fluid control passage permitting fluid flow therethrough due to an outgoing tide thereby forcing a flow of fluid out of said first output passage, one way valve control means said one way valve control means benig positioned between said fluid amplifier and said fluid flow control means and in each of said first and second fluid flow control passages to permit fluid flow into said fluid amplifier, and first and second pressure indicating means, said first pressure indicating means connected with said first output passage for measuring the output of said first output passage thereby indicating the pressure output resulting from an outgoing tide, said second pressure indicating means connected with said second pressure output passage thereby indicating fluid flow from said second output passage due to an incoming tide.

References Cited

UNITED STATES PATENTS 3,258,685 6/1966 Horton _____ 137—81.5 X
3,375,841 4/1968 Schonfeld et al.

OTHER REFERENCES

"A Three-Stage Digital Amplifier," Campagnuolo, Harry Diamond Laboratory, Fluid Amplification; pp. 23, 24; Nos. 1–9; received Oct. 1, 1963, TP 156 F65U5f C.3

RICHARD C. QUEISSER, Primary Examiner

J. R. FLANAGAN, Assistant Examiner